United States Patent [19]

Bertin et al.

[11] Patent Number: 4,828,093
[45] Date of Patent: May 9, 1989

[54] DEVICE FOR CONTROLLING A COUPLING MECHANISM SUCH AS A CLUTCH

[75] Inventors: Patrice Bertin, Mery/Oise; Yvon Sevennec, Vernovillet; Christian Pankowiak, Saint-Ouen, all of France

[73] Assignee: Valeo, Paris, France

[21] Appl. No.: 147,993

[22] Filed: Jan. 25, 1988

[30] Foreign Application Priority Data

Feb. 3, 1987 [FR] France ................. 87 01262

[51] Int. Cl.[4] ............................................. F16D 23/12
[52] U.S. Cl. ..................................... 192/90; 74/89.14; 74/89.19
[58] Field of Search .............. 192/90; 74/89.14, 89.19, 74/10.85

[56] References Cited

U.S. PATENT DOCUMENTS

| | | | |
|---|---|---|---|
| 4,557,355 | 12/1985 | Wilke et al. ........................ | 188/173 |
| 4,650,056 | 3/1987 | Sevennec et al. ..................... | 192/90 |
| 4,651,852 | 3/1987 | Wickham et al. ..................... | 192/2 |
| 4,651,855 | 3/1987 | Grunberg et al. ............... | 192/0.032 |
| 4,671,400 | 6/1987 | Grunberg et al. .............. | 192/111 A |
| 4,750,596 | 6/1988 | Grunberg et al. ..................... | 192/7 |

FOREIGN PATENT DOCUMENTS 220092  4/1987  European Pat. Off. ............. 192/90
2161237  1/1986  United Kingdom .

OTHER PUBLICATIONS

Scott, David; "Footloose Shifting"; *Popular Science;* Mar. 1988; pp. 64–65.

Filderman, R. and Grunberg, P.; "Electronic Actuator Eliminates Clutch Pedal"; *Automotive Engineering;* Oct. 1984; pp. 81–85.

*Primary Examiner*—Leslie A. Braun
*Assistant Examiner*—Scott Anchell
*Attorney, Agent, or Firm*—Charles E. Brown; Charles A. Brown

[57] ABSTRACT

Motorized control device, suitable for a motor vehicle clutch, comprises a motor which activates a shaft and a lever by means of a connection mechanism associated with a force moderator arrangement incorporating a spring; according to the invention, this spring is mounted under compression.

6 Claims, 1 Drawing Sheet

DEVICE FOR CONTROLLING A COUPLING MECHANISM SUCH AS A CLUTCH

BACKGROUND OF THE INVENTION

1. Field of the Invention

The invention relates to device for controlling a coupling mechanism, and in particular to a motorised device which enables the conventional friction clutch of a motor vehicle which does not incorporate a conventional clutch pedal, to be controlled. A control device in accordance with the invention may also be suitable for operating a variable speed drive, a brake or similar mechanism.

2. Description of the Related Art

A motorised clutch control device of the above-mentioned kind is described, for example, in French Patent Application No. 84.08323 filed on 28th May 1984. A device of this kind mainly comprises an electric motor associated with a reduction gear, a member for activating the coupling mechanism (comprising, for example, a lever in the form of a fork, which is known per se) and a connection mechanism disposed in a housing between the motor and the activating member and comprising, inter alia, a toothed sector connected to the activating member, at least one pinion disposed between the motor shaft and the toothed sector, and a force moderator arrangement comprising a spring connected to a pinion which is in engagement with the toothed sector. The arrangement is such that the spring can assist the electric motor, which is of relatively small power, by moderating the force which the latter must provide along an engaging or disengaging stroke.

In these previous constructions the force moderator spring is a helical spring operating under tension and disposed in the housing.

A problem arises when fitting out a powerful vehicle in which substantial power has to be applied to the clutch, as in this case the force applied to the compensating spring increases to the point at which it eventually results in fatigue in the spring attachment end, which can cause it to break. A stronger spring has to be used, although the space required for mounting a stronger spring of this kind is often limited.

The object of the invention is to minimise this drawback.

SUMMARY OF THE INVENTION

A control device as described above is characterised in that the spring comprises a spring operating under compression.

A spring of this kind is always mounted between a fixed bearing and a mobile stop, which are parallel and perpendicular to the axis of the spring, by always being guided such that it remains rectilinear during operation.

For the purpose of using a compression spring which, while having identical characteristics, has a much smaller volume than a tension spring, the invention proposes a device for controlling a coupling mechanism, such as a clutch, of the kind comprising a motor, a member for activating the coupling mechanism, and a connection mechanism arranged in a housing between the motor and the activating member, and a force moderator arrangement comprising a spring connected to the connection mechanism, in which the spring is mounted under compression between a fixed bearing and a stop which can rotate and describe a translatory movement such as a collar connected to an arm which is articulated at its other end to a pinion of the connection mechanism.

The mobile stop, which is connected to an arm articulated at its other end to a pinion, does not always remain parallel to the fixed bearing during use, and the spring is caused to act in an unusual manner, as it has a substantially toric shape. However tests have shown that, unexpectedly, it operates in an entirely satisfactory manner.

DESCRIPTION OF THE PREFERRED EMBODIMENTS

Figure 1:
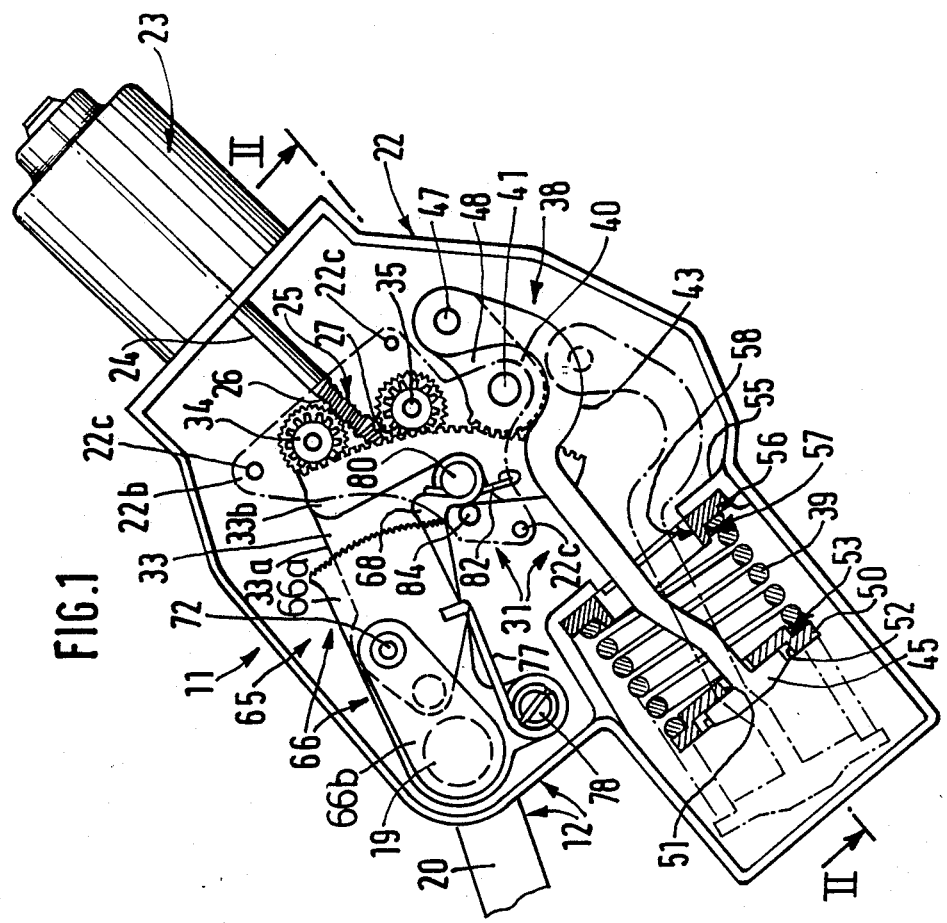
FIG. 1 is a diagrammatic view of the control device.
Figure 2:
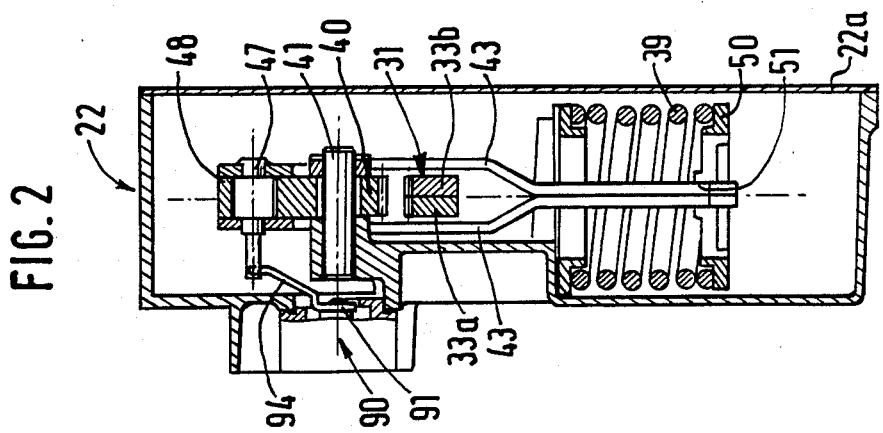
FIG. 2 is a section along the line II—II in FIG. 1.

The illustrated device 11 is designed to control a coupling mechanism (not shown) such as a friction clutch which is activated by a conventional clutch release bearing moved by an activating member 12 which is formed by a fork-shaped lever 20 integral with a shaft 19. This control device, which is able to pivot the lever 20, is motorised. It is formed by a main housing 22, which is relatively flat, and an electric motor 23 fixed to the outside of the said housing. The shaft 24 of the motor 23 penetrates the housing 22 and ends in a threaded portion 25 having two sections 26, 27 with inverse threads. The housing 22 also accommodates a connection mechanism 31 arranged between the motor 23 and the above-mentioned activating member. This connection mechanism comprises a toothed sector 33, which is connected to the shaft 19 and pivots with respect to its axis, and two pinions 34, 35, each of which comprises two toothed wheels disposed coaxially next to one another. In this case the toothed sector 33 is formed in two parts, a main part 33a extending from the shaft 19 to the toothed part, and a secondary reinforcing part 33b which is essential in the form of a strip having the same teeth. The juxtaposition of these parts enables a punched sheet sector with relatively wide teeth to be formed.

Each of the pinions 34, 35 is formed such that one of its toothed wheels engages with the toothed sector 33 and the other toothed wheel engages with one of the threaded sections 26 or 27. The two pinions pivot about parallel axes disposed on either side of the threaded portion 25. This mounting arrangement, which is known per se, has the advantage of absorbing the axial reactions on the threaded portion of the motor shaft. Furthermore, the connection mechanism comprises a wear take-up mechanism 65 combined with the toothed sector 33. This mechanism comprises a flat lever 66, which is mounted in a pivotable manner parallel with the toothed sector, and a ratchet 68. The lever 66 consists of two components 66a and 66b. The component 66a comprises a toothed edge co-operating with teeth of the ratchet 68. The component 66b is fixed to the shaft 19 so as to cause the latter to rotate; it comprises a lug 72 engaged in an elongated hole in the component 66a. This mounting arrangement gives the component 66a a wider range of movement than that of the component 66b. This guarantees a high degree of operating precision. The component 66a is caused to rotate by a spring 77 which is wound around a lug 78 integral with the toothed sector 33. The ratchet 68 can pivot on a trunnion 80 mounted on the toothed sector 33 and is acted upon by a spring 82 such that its toothed portion engages with that of the component 66a.

The ratched is disengaged from the component 66a at the end of the travel of the toothed sector 33 by the said ratched bearing against a stop 84 integral with the housing 22.

This wear take-up mechanism is similar to the one described in French Patent Application No. 84.08324 filed on 28th May 1984.

In order to close the housing 22 by a cover 22a made of a punched single sheet of a low cost price, the pinions 34 and 35 and the toothed sector 33 are held in position, by means of the trunnion 80 of the ratchet 68, by a plate 22b shown by dot-dash lines in FIG. 1. This plate is fixed by screws 22a to the bottom of the housing 22.

The housing 22 also comprises an angle measuring means formed by a potentiometer 90 whose shaft 91 is connected to the pinion 40 by an arm 94. This measuring means enables the exact position of the control device to be known at any moment. This is necessary in order to operate the motor 23.

The device according to the invention also comprises an operating force moderator arrangement 38 which assists the electric motor 23 during the engaging operations, as described in the above-mentioned patent applications.

An operating force moderator arrangement 38 of this kind comprises a helical spring 39 connected to a pinion 40 which is mounted in a rotatable manner about a shaft 41 fixed to the housing.

This pinion is formed with a circular toothed portion on one side engaging with the toothed sector 33 and a radial extension 48 on the other bearing a spindle 47 to which a bent arm 43 is connected in such a way that it can pivot. This arm, which is connected to the spring 39 by its other end, is partly formed by two parallel components which are articulated, as can be seen in the drawings, in the vicinity of the pinion 40 and of the toothed sector 33, without hampering the movements of these.

According to the invention the spring 39 is mounted under compression between a fixed bearing and a collar 50 which is connected to the end of the arm 43 which is not connected to the pinion 40. For this purpose the end of the arm is enlarged to form a joining piece 45. The collar 50 comprises a central opening 51 and, in its face opposite the spring 39, a bore 52 for positioning the joining piece 45.

The external diameter of the face against which the spring 39 is mounted is the same as the internal diameter of the spring, while the external diameter of the collar 50 is the same as the external diameter of the spring. This enables a shoulder 53 to be formed which has the function of positioning and centering the spring against the collar 50.

In this case the fixed bearing is formed by a projection 55 cast with the housing 22. A collar 56 is disposed between the projection 55 and the spring and positions the latter against a shoulder 57 with which it is provided for this purpose.

The arm 43 passes through the collar 56 via an opening 58 of a sufficient size not to hamper the lateral movement which is imparted to the collar when the pinion 40 rotates.

In order to mount the spring, the arm 43 is passed through the collar 50, the spring 39 is disposed on the collar 50 and then the collar 56 on the spring. The arm, which is thus provided with the spring and the collars, is then mounted in the housing 22 by positioning the collar 56 against the projection 55, after which the spring is compressed until the end of the arm 43 is attached to the extension of the pinion 40 by the spindle 47.

During operation of the device the rotating pinion 40 moves the arm 43 into the extreme position shown by dot-dash lines in FIG. 1. As the spring is positioned against the shoulders 53, 57 of the collars, it is correctly held in place during its lateral movements, and the use of this spring, which is mounted under compression, for non-rectilinear movements gives satisfactory results.

What is claimed is:

1. A control device for controlling a mechanism such as a clutch, comprising an electric motor; a control member for activating said mechanism; a connection mechanism disposed in a housing between said motor and the said control member; and a force moderator arrangement comprising a spring connected to the said connection mechanism, wherein said spring is mounted under compression between a fixed bearing and a stop which can rotate and describe a translatory movement such as a collar connected to an arm which is articulated at its other end to a pinion of said connection mechanism.

2. A control device according to claim 1, wherein said fixed bearing is a projection cast with the housing.

3. A control device according to claim 2, wherein a collar is disposed between the projection and the spring.

4. A control device according to claim 3, wherein said collar comprises a shoulder for positioning the spring.

5. A control device according to claim 1, wherein said arm has an enlarged end which is positioned in a bore in the collar.

6. A control device according to claim 1, wherein said collar comprises a shoulder for positioning the spring.

* * * * *